United States Patent
Chang et al.

(10) Patent No.: US 6,674,586 B2
(45) Date of Patent: Jan. 6, 2004

(54) SPEED VARIATION MECHANISM

(75) Inventors: Sean Chang, Tao Yuan (TW); Shih-Shiun Chang, Kaohsiung (TW)

(73) Assignee: Delta Electronics, Inc. (TW)

( * ) Notice: Subject to any disclaimer, the term of this patent is extended or adjusted under 35 U.S.C. 154(b) by 1 day.

(21) Appl. No.: 10/191,621

(22) Filed: Jul. 8, 2002

(65) Prior Publication Data

US 2003/0123146 A1 Jul. 3, 2003

(30) Foreign Application Priority Data

Dec. 31, 2001 (TW) .................................. 90133399 A

(51) Int. Cl.$^7$ ................................................ G02B 7/02
(52) U.S. Cl. ..................... 359/826; 359/813; 359/824
(58) Field of Search ............................... 359/813, 814, 359/822, 823, 824, 826, 694, 704

(56) References Cited

U.S. PATENT DOCUMENTS 3,291,996 A * 12/1966 Stimson ....................... 250/234
5,631,776 A * 5/1997 Weigand et al. ............. 359/694

* cited by examiner

Primary Examiner—Ricky Mack
(74) Attorney, Agent, or Firm—Martine & Penilla, LLP

(57) ABSTRACT

A speed variation mechanism includes a base, a first sliding member, a second sliding member and a fixing device. The base has a first surface. The first sliding member is able to slide on the first surface and has a second surface. The second sliding member is able to slide on the second surface and has a third surface. The third surface is in contact with a driven member to drive an optical device. The fixing device can selectively fix the first sliding member to the base or the second sliding member. When the second sliding member is pushed, the speed variation mechanism of the invention can provide different moving speeds for the driven member to drive the optical device by fixing the first sliding member to the base or the second sliding member.

20 Claims, 3 Drawing Sheets

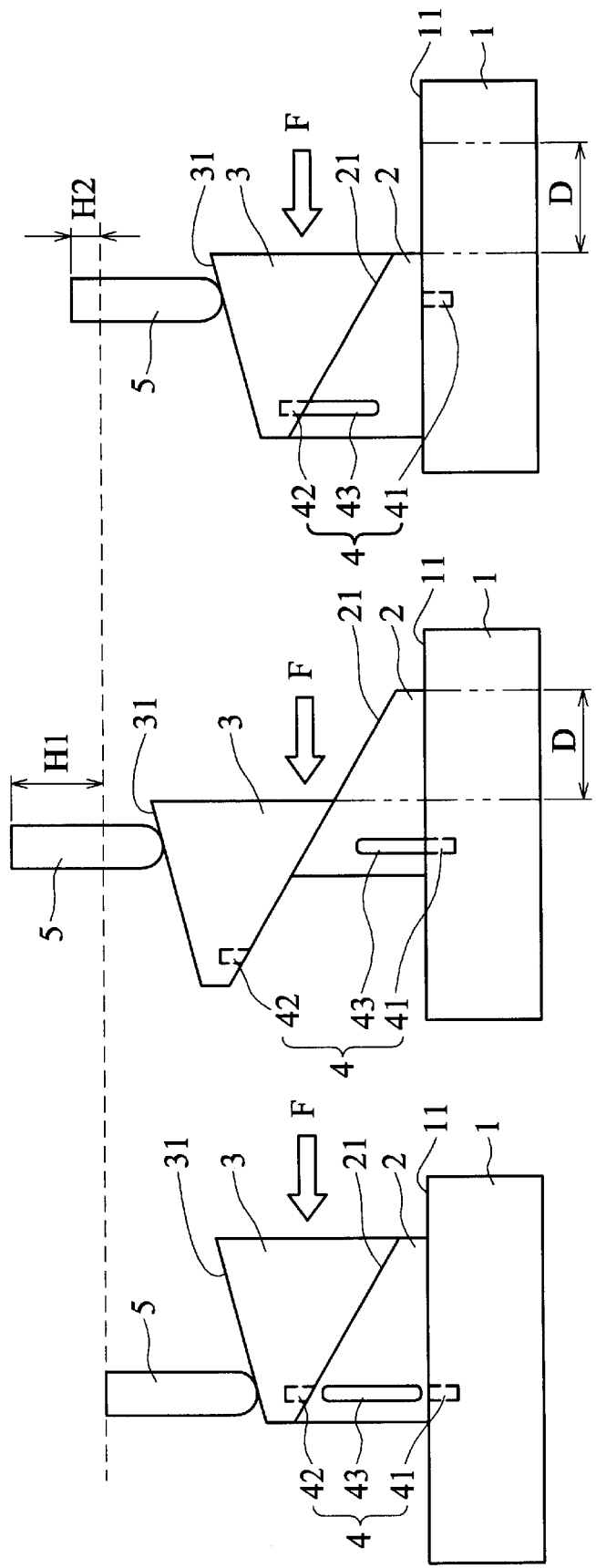

SPEED VARIATION MECHANISM

BACKGROUND OF THE INVENTION

1. Field of the Invention

The invention relates to a speed variation mechanism and, more particularly, to a speed variation mechanism capable of providing different moving speeds to drive an optical device.

2. Description of the Related Art

In an optical communication apparatus (e.g., an optical switch, a tunable optical attenuator or a tunable filter) having a movable mechanical structure, a linear driving mechanism capable of providing quick and precise positioning functions is required to reduce optical signal loss during the switching process.

The optical device sometimes has to be moved at different speeds according to the moving distance and the rotation angle. If a stepping motor is used to directly drive the optical device in the optical communication apparatus, the response speed is slow because: (a) a positioning device has to be provided with respect to the stepping motor so as to prevent the stepping motor from losing its positioning precision; and (b) the stepping motor has an upper limit of the rotation speed. Furthermore, a temporary demagnetization phenomenon may occur when the rotation speed of the motor is too high, thereby causing the stepping motor to lose steps due to the linear correlation between the rotation angle of the motor and the moving speed of the optical device. Consequently, if the moving speed of the optical device is changed by directly changing the rotation speed of the motor, the positioning precision of the optical device becomes poor because the stepping motor may lose steps at a higher rotation speed.

Another design of the linear driving mechanism utilizes the motor in conjunction with a lead screw to drive the optical device. This design can effectively prevent the stepping motor from losing steps. However, if higher positioning precision is required, the moving speed of the optical device becomes slower because a high-precision lead screw is a deceleration mechanism with a high deceleration ratio. Therefore, the optical device cannot be quickly moved to the correct position. If a variably reducing gear box capable of changing the operation speed is used, the volume thereof becomes too large and the gap between the gears may cause the difficulty in positioning precision. Furthermore, if there are too many required elements, the manufacturing and assembling costs may also increase.

SUMMARY OF THE INVENTION

In view of the above-mentioned problems, an object of the invention is to provide a speed variation mechanism capable of providing different speed deceleration ratios using a simple structure.

Another object of the invention is to provide a speed variation mechanism capable of preventing the stepping motor from losing steps.

To achieve the above-mentioned objects, the invention provides a speed variation mechanism including a base, a first sliding member, a second sliding member and a fixing device. The base has a first surface. The first sliding member is able to slide on the first surface and has a second surface. The second sliding member is able to slide on the second surface and has a third surface. The third surface is in contact with a driven member so as to drive an optical device. The fixing device selectively fixes the first sliding member to the base or the second sliding member. When the second sliding member is pushed, the speed variation mechanism of the invention can provide different moving speeds for the driven member to drive the optical device by fixing the first sliding member to the base or the second sliding member.

In one embodiment of the invention, the base may be formed with at least a first hole, and the second sliding member may be formed with at least a second hole. The fixing device may include a pin disposed in the first sliding member to selectively inserted into one of the at least a first hole and the at least a second hole.

In another embodiment of the invention, the base may include a first permanent magnet, and the second sliding member may include a second permanent magnet. The fixing device may include an electromagnet capable of changing a direction of the magnetic pole. The electromagnet is disposed in the first sliding member to selectively attract one of the first permanent magnet and the second permanent magnet.

The speed variation object of this invention is implemented by changing the slope of the contact surface between the linear driving members (i.e., the first and second sliding members) and the driven member to cause different speed ratios. Accordingly, the volume can be made small to fit into a limited space, and the response speed can be made quick. In addition, time for moving the driven member can be shortened so as to achieve the objects of quick positioning and switching.

BRIEF DESCRIPTION OF THE DRAWINGS

FIG. 2A to FIG. 2C are schematic illustrations showing the operating states of the speed variation mechanism in accordance with the preferred embodiment of the invention.

DETAILED DESCRIPTION OF THE PREFERRED EMBODIMENTS

The speed variation mechanisms in accordance with preferred embodiments of the invention will be described with reference to the accompanying drawings, wherein the same reference numbers denote the same elements.

Figure 1:
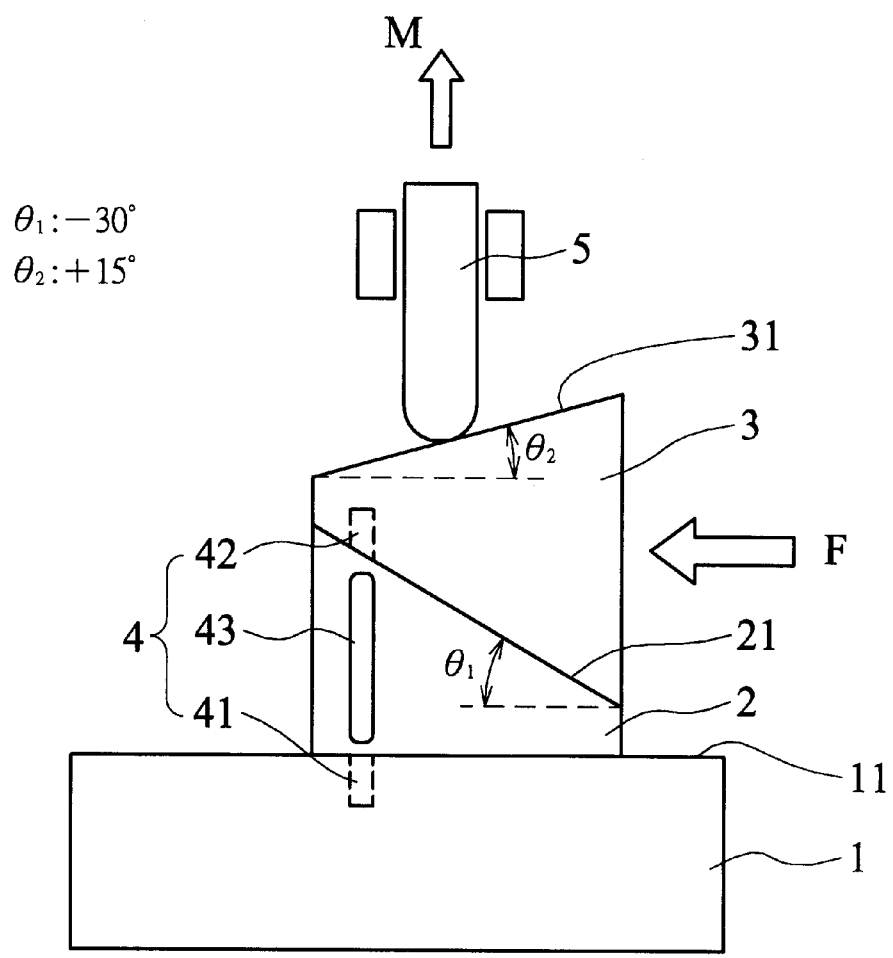
FIG. 1 is a schematic illustration showing the structure of the speed variation mechanism in accordance with a preferred embodiment of the invention.

Referring to FIG. 1, a speed variation mechanism in accordance with a preferred embodiment of the invention includes a base 1, a first sliding member 2, a second sliding member 3 and a fixing device 4. The base 1 has a first surface 11, the first sliding member 2 has a second surface 21, and the second sliding member 3 has a third surface 31. The first sliding member 2 is arranged on the first surface 11 of the base 1 and is able to slide on the first surface 11. The second sliding member 3 is arranged on the second surface 21 of the first sliding member 2 and is able to slide on the second surface 21. A driven member 5 is arranged above the second sliding member 3, contacts the third surface 31 of the second sliding member 3, and is able to move along a direction indicated by the arrow M of FIG. 1.

In this embodiment, the second surface 21 is inclined at a first angle $\theta_1$ relative to the first surface 11, while the third surface 31 is inclined at a second angle $\theta_2$ relative to the first surface 11. The first angle $\theta_1$ is different from the second angle $\theta_2$. For example, the first angle $\theta_1$ may be −30 degrees, and the second angle $\theta_2$ may be +15 degrees. In other words, the first angle $\theta_1$, may be positive and the second angle $\theta_2$ may be negative so that the second sliding member is formed as a trapezoid structure, as shown in FIG. 1.

In this embodiment, the fixing device 4 includes a first hole 41, a second hole 42 and a fixing pin 43. The first hole 41 is formed in the base 1 while the second hole 42 is formed in the second sliding member 3. The fixing pin 43 can slide up and down to selectively insert into the first hole 41 or the second hole 42.

The operating processes of the speed variation mechanism in accordance with the preferred embodiment of the invention will be described in detail with reference to the accompanying drawings.

FIG. 2 shows three states of the speed variation mechanism in accordance with the preferred embodiment of the invention. FIG. 2A shows a state A before the first sliding member 2 and the second sliding member 3 on the base 1 are pushed. FIG. 2B shows a state B in which the first sliding member 2 is fixed on the base 1, and the second sliding member 3 are pushed to move on the second surface 21. FIG. 2C shows a state C in which the first sliding member 2 and the second sliding member 3 are fixed together to slide on the first surface 11.

In the state B as shown in FIG. 2B, because the fixing pin 43 of the fixing device 4 is inserted downward into the first hole 41 of the base 1, the first sliding member 2 is fixed when the second sliding member 3 is pushed along a direction F. Thereby, the driven member 5 is moved by a distance H1 after the second sliding member 3 slides to the left-hand side of FIG. 2 by a distance D on the second surface 21.

In the state C as shown in FIG. 2C, because the fixing pin 43 of the fixing device 4 is inserted upward into the second hole 42 of the second sliding member 3, the first sliding member 2 slides together with the first sliding member on the first surface 11 when the second sliding member 3 is pushed along the direction F. Thereby, the driven member 5 is moved upwardly by a distance H2 after the first sliding member and the second sliding member slide to the left-hand side of FIG. 2 by the distance D.

When the state B is compared with the state C, the following results can be found in this embodiment. Although the sliding distances of the second sliding member 3 in the states B and C are the same, the moving heights of the driven member 5 are not the same by fixing the first sliding member 2 to the base 1 or the second sliding member 3. The moving height H1 of the driven member 5 in the state B is greater than the moving height H2 of the driven member 5 in the state C. Accordingly, the speed variation mechanism of this embodiment can provide different moving speeds for the driven member 5.

In this embodiment, it should be noted that the following phenomenon will occur if the first angle $\theta_1$ of the second surface 21 is a zero degree angle (i.e., the second surface 21 is parallel to the first surface 11). When the second sliding member 3 is pushed, the moving speeds of the driven member 5 are the same no matter which one of the base 1 and the second sliding member 3 is fixed to the first sliding member 2. In addition, if the first angle $\theta_1$ of the second surface 21 is the same as the second angle $\theta_2$ of the third surface 31 (i.e., the second surface 21 is parallel to the third surface 31), the driven member 5 would not be moved when the first sliding member 2 is fixed to the base 1 and the second sliding member 3 is pushed to slide. In order to provide different moving speeds of the driven member, those skilled in the art may consider many factors to design different angles of the surfaces. In addition, instead of only one first hole 41 and second hole 42, several first holes 41 and one second holes 42 may also be formed.

Figure 3C:
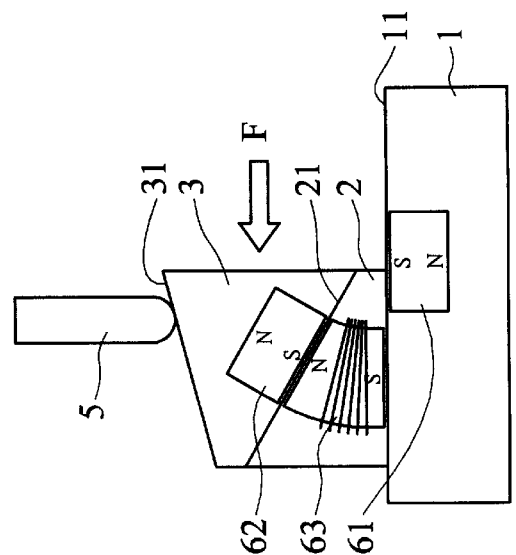
FIG. 3A to FIG. 3C are schematic illustrations showing the operating states of the speed variation mechanism in accordance with another preferred embodiment of the invention.
Figure 3B:
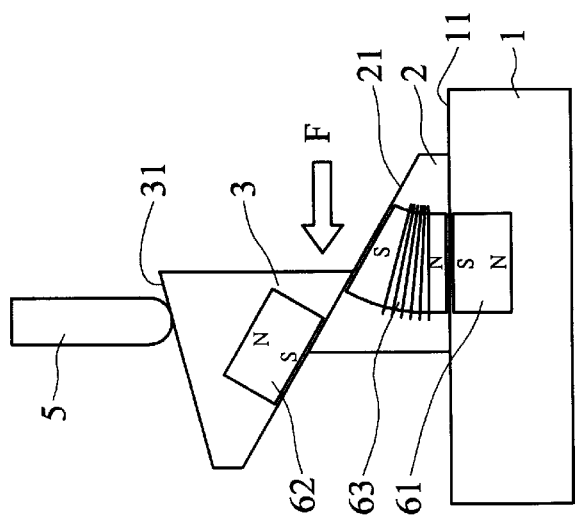
Figure 3A:
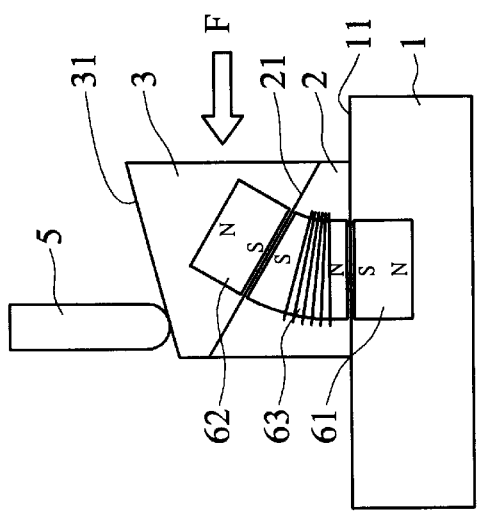

In another embodiment of the invention as shown in FIG. 3, the base 1 includes a first permanent magnet 61, the second sliding member includes a second permanent magnet 62, and the fixing device includes an electromagnet 63 capable of changing its direction of the magnetic pole.

The direction of the magnetic pole of the electromagnet 63 can be adjusted so that the electromagnet 63 can attract the first permanent magnet 61 or the second permanent magnet 62 and repels the other. When the direction of the magnetic pole of the electromagnet 63 is that as shown in FIG. 3B, the electromagnet 63 attracts the first permanent magnet 61 of the base 1 and repels the second permanent magnet 62 on the second sliding member 3. In this case, the normal force between the base 1 and the first sliding member 2 is greater than that between the first sliding member 2 and the second sliding member 3 so that the friction force between the base 1 and the first sliding member 2 is greater than that between the first sliding member 2 and the second sliding member 3. Consequently, when a proper force is applied to push the second sliding member 3, the first sliding member 2 will not move while the second sliding member 3 will slide on the second surface 21.

When the direction of the magnetic pole of the electromagnet 63 is that as shown in FIG. 3C, the electromagnet 63 attracts the second permanent magnet 62 of the second sliding member 3 and repels the first permanent magnet 61 of the base 1. In this case, the normal force between the base 1 and the first sliding member 2 is smaller than that between the first sliding member 2 and the second sliding member 3 such that the friction force between the base 1 and the first sliding member 2 is smaller than that between the first sliding member 2 and the second sliding member 3. Consequently, when a proper force is applied to push the second sliding member 3, the first sliding member 2, together with the second sliding member 3, will slide on the first surface 11.

Therefore, through changing the direction of the magnetic pole of the electromagnet 63, the fixing device may selectively fix the first sliding member 2 to the base 1 or the second sliding member 3, so as to change the moving speed of the driven member 5.

To sum up, the speed variation object of this invention is implemented by changing the slope of the contact surface between the linear driving members (i.e., the first and second sliding members) and the driven member to cause different speed ratios. Accordingly, the volume can be made small to fit into a limited space, and the response speed can be made quick. In addition, the time for moving the driven member can be shortened so as to achieve the objects of quick positioning and switching.

It should be noted that various equivalent changes and modifications might be easily made to those skilled in the art without departing from the spirits and scope of the invention. For instance, the cross-section shapes of the first and second sliding member in the speed variation mechanism are not limited to a trapezoid, but may be a triangle or any other shapes. In addition, the number of the sliding members is not limited to two. Furthermore, a number of sliding members having inclined surfaces with different slopes may be adopted in the deceleration mechanism so as to achieve the effect of providing various speed variation ratios.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation, so as to encompass all such modifications.

What is claimed is:

1. A speed variation mechanism for driving an optical device, comprising:

a base having a first surface;

a first sliding member being able to slide on the first surface and having a second surface positioned at a first angle relative to the first surface;

a second sliding member being able to slide on the second surface and having a third surface positioned at a second angle relative to the first surface, the third surface being in contact with a driven member to drive the optical device; and a fixing device for selectively fixing the first sliding member to one of the base and the second sliding member.

2. The speed variation mechanism according to claim 1, wherein the base is formed with at least a first hole, the second sliding member is formed with at least a second hole, and the fixing device includes a pin disposed in the first sliding member to be selectively inserted into one of the at least a first hole and the at least a second hole.

3. The speed variation mechanism according to claim 1, wherein the base has a first permanent magnet, the second sliding member has a second permanent magnet, and the fixing device includes an electromagnet mounted in the first sliding member to selectively attract one of the first permanent magnet and the second permanent magnet through changing a direction of the magnetic pole thereof.

4. The speed variation mechanism according to claim 1, wherein the first angle is nonzero.

5. The speed variation mechanism according to claim 1, wherein the second angle is nonzero.

6. The speed variation mechanism according to claim 1, wherein the first angle is different from the second angle.

7. The speed variation mechanism according to claim 1, wherein each of the first sliding member and the second sliding member has a trapezoid cross-section.

8. The speed variation mechanism according to claim 1, wherein each of the first sliding member and the second sliding member has a triangle cross-section.

9. A speed variation mechanism for driving an optical device, comprising:

a base having a first surface;

a first sliding member being able to slide on the first surface and having a second surface positioned at a first angle relative to the first surface;

a second sliding member being able to slide on the second surface and having a third surface positioned at a second angle, different from the first angle, relative to the first surface, the third surface being in contact with a driven member to drive the optical device; and a fixing device for selectively fixing the first sliding member to one of the base and the second sliding member.

10. The speed variation mechanism according to claim 9, wherein the base is formed with at least a first hole, the second sliding member is formed with at least a second hole, and the fixing device includes a pin disposed in the first sliding member to be selectively inserted into one of the at least a first hole and the at least a second hole.

11. The speed variation mechanism according to claim 9, wherein the base has a first permanent magnet, the second sliding member has a second permanent magnet, and the fixing device includes an electromagnet mounted in the first sliding member to selectively attract one of the first permanent magnet and the second permanent magnet through changing a direction of the magnetic pole thereof.

12. The speed variation mechanism according to claim 9, wherein the first angle is nonzero.

13. The speed variation mechanism according to claim 9, wherein the second angle is nonzero.

14. The speed variation mechanism according to claim 9, wherein each of the first sliding member and the second sliding member has a trapezoid cross-section.

15. The speed variation mechanism according to claim 9, wherein each of the first sliding member and the second sliding member has a triangle cross-section.

16. A speed variation mechanism for driving an optical device, comprising:

a base having a first surface;

a first sliding member being able to slide on the first surface and having a second surface positioned at a first angle relative to the first surface;

a second sliding member being able to slide on the second surface and in contact with a driven member to drive the optical device; and a fixing device for selectively fixing the first sliding member to one of the base and the second sliding member.

17. The speed variation mechanism according to claim 16, wherein the base is formed with at least a first hole, the second sliding member is formed with at least a second hole, and the fixing device includes a pin disposed in the first sliding member to be selectively inserted into one of the at least a first hole and the at least a second hole.

18. The speed variation mechanism according to claim 16, wherein the base has a first permanent magnet, the second sliding member has a second permanent magnet, and the fixing device includes an electromagnet mounted in the first sliding member to selectively attract one of the first permanent magnet and the second permanent magnet through changing a direction of the magnetic pole thereof.

19. The speed variation mechanism according to claim 16, wherein each of the first sliding member and the second sliding member has a trapezoid cross-section.

20. The speed variation mechanism according to claim 16, wherein each of the first sliding member and the second sliding member has a triangle cross-section.

* * * * *